United States Patent
Mizuuchi et al.

(10) Patent No.: US 7,139,233 B2
(45) Date of Patent: Nov. 21, 2006

(54) OPTICAL INFORMATION PROCESSING DEVICE AND RECORDING MEDIUM

(75) Inventors: Kiminori Mizuuchi, Neyagawa (JP); Kazuhisa Yamamoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/525,676

(22) PCT Filed: Aug. 18, 2003

(86) PCT No.: PCT/JP03/10422

§ 371 (c)(1),
(2), (4) Date: Feb. 18, 2005

(87) PCT Pub. No.: WO2004/019333

PCT Pub. Date: Mar. 4, 2004

(65) Prior Publication Data

US 2005/0254393 A1 Nov. 17, 2005

(30) Foreign Application Priority Data

Aug. 21, 2002 (JP) ............................... 2002-240132

(51) Int. Cl.
*G11B 7/00* (2006.01)
(52) U.S. Cl. ............................ 369/112.01; 369/112.22; 369/44.23

(58) Field of Classification Search ............. 369/44.23, 369/44.24, 275.3, 94, 112.1, 112.01, 112.22, 369/112.23, 103, 44.37, 122, 121
See application file for complete search history.

(56) References Cited

U.S. PATENT DOCUMENTS 6,480,455 B1 * 11/2002 Takahashi .............. 369/112.22
6,992,965 B1 * 1/2006 Glushko et al. ............ 369/103

FOREIGN PATENT DOCUMENTS

| JP | 1-271932  | 10/1989 |
| JP | 4-61637   | 2/1992  |
| JP | 9-50629   | 2/1997  |
| JP | 9-223315  | 8/1997  |

OTHER PUBLICATIONS

Kawata et al., "Use of two-photon absorption in a photorefractive crystal for three-dimensional optical memory", Optics Letters (1998); 23: 756-758, month not found.

* cited by examiner

*Primary Examiner*—Nabil Hindi
(74) *Attorney, Agent, or Firm*—Hamre, Schumann, Mueller & Larson, P.C.

(57) ABSTRACT

An optical information processing device is provided with a multi-wavelength light source that emits light of two or more different wavelengths, a filter portion that separates the light emitted from the multi-wavelength light source according to wavelength, and a condensing lens that focuses a plurality of lights separated by the filter portion on the same point for multi-wavelength recording.

15 Claims, 4 Drawing Sheets

OPTICAL INFORMATION PROCESSING DEVICE AND RECORDING MEDIUM

This application is a 371 of PCT/JP03/10422 Aug. 18, 2003.

TECHNICAL FIELD

The present invention relates to optical information processing devices and recording media used in the fields of optical recording and optical communications.

BACKGROUND ART

Conventional optical information processing devices carry out recording and reproduction using optical recording media such as CD-R, CD-RW, and DVD-RAM. With these recording media, recording is carried out using light of a single wavelength and therefore recording is carried out using, for example, changes in the recording medium's refractive index due to phase changes or the like. As for recording techniques, there are single-layer and double-layer recording techniques, and recording capacity is limited by the surface area of the recording medium.

In carrying out reproduction from a recording medium, a laser light is focused on the recording medium from an external portion and miniscule indentations formed on the transparent recording medium, or changes in the reflectivity of refractive index change portions, are read, and thus the recorded information is read out.

On the other hand, in recording on the recording medium, writing is carried out by focusing light to the recording medium and causing a change such as phase change, sublimation, or perforation due to the heat at the light-focused area. The above is a recording-reproduction method based on a laser light source of one photon/one wavelength.

Furthermore, the use of recording media in a volumetric direction (volumetric recording) in order to improve the capacity of recording media is being investigated. For example, proposals and experimental manufacture have been carried out such as a technique in which information is volumetrically recorded within the surface and depth (thickness) direction of a bulk-state recording medium and an optical disk of a construction having multilayer recording layers. However, when the refractive index of each layer is different in the case of recording layers having a multilayer construction, there is a tendency for multiple interference of the laser light to occur as well as a tendency for recording interference to occur between layers. Furthermore, as the number of recording layers increases, there is less light reflected from the layers distant from the light source, and therefore it becomes difficult to obtain a sufficient S/N ratio.

Further still, when carrying out recording using single photon absorption, the recording layers are made into multiple layers and in order to absorb the laser light pertaining to the wavelength range for enabling recording, it is necessary for the recording power of the light to be extremely large when recording a layer that is distant from the light source. When the power of the laser light source for recording is increased, there is a problem known as cross erasure by which information recorded on a recording layer close to the light source is inadvertently erased when recording information on a recording layer that is distant from light source.

Recording techniques based on two-photon absorption have been proposed as a way to solve these problems. A conventional recording method using two-photon absorption is disclosed in Y. Kawata, Optics Letters, Vol. 23, No. 10, pp. 756–758, 1998 for example. In this recording method, a pulse light of a 762 nm wavelength at approximately 130 fs is used as a laser light for writing and information is recorded on a recording medium made of $LiNbO_3$ crystal. A refractive index distribution is formed in the crystal using absorption of 381 nm wavelength light with two-photon absorption of 762 nm wavelength light. $LiNbO_3$ is transparent with respect to light of a 762 nm wavelength and is absorptive with respect to light of a 381 nm wavelength. Two-photon absorption is produced based on a nonlinear optical effect in the focused spot of the light, which is absorbed for recording. The recording medium does not absorb light until the light power in the vicinity of the focused spot in which two-photon absorption is produced reaches a high-density state, and therefore light is absorbed in recording areas only. For this reason, the problems of absorption and cross erasure, which are problems in volumetric recording, do not occur and high-density volumetric recording becomes possible.

In conventional optical recording methods using a single wavelength and single photon, the recording density has a threshold value due to such factors as the wavelength of the light source and the NA of the recording focusing optical systems such as the condensing lens, and therefore further increases in capacity are difficult. Furthermore, there are the problems of interlayer recording interference and cross erasure when recording on a multilayer recording medium and there is the problem that there are limits to making recording layer multilayered and volumetric recording.

Furthermore, in the technique of using two-photon absorption of a single wavelength, recording is carried out with a 381 nm wavelength based on two-photon absorption using a light of a long wavelength (in conventional examples, a light of a 762 nm wavelength) as the recording light. However, when reading out the recorded bits (information), it is necessary to have a light that has a wavelength other than the wavelength of the laser light for recording. This is because the recording density is reduced if the laser light for recording is used for reading since its wavelength is long.

Furthermore, there are techniques of recording using light of two different wavelengths. When recording using a light source of two different wavelengths, the light of the two wavelengths produced from different emission apertures must be focused to the same point. For this reason, there is a problem in that complicated focusing and optical systems are required to solve issues such as correction of wavelength dispersion, focal point control, and focal point control using wavelength variation of the light source. Furthermore, a high output femtosecond laser with a peak power of several 100 W is required in order to use two-photon absorption. A large-size light source is required for this, which is a problem in that application to consumer products is difficult.

DISCLOSURE OF INVENTION

The present invention has been devised to solve these issues, and it is an object thereof to provide an optical information processing device capable of carrying out multi-wavelength recording without complicated control and a recording medium on which information is optically recorded.

An optical information processing device according to the present invention is provided with a multi-wavelength light source that emits light of two or more different wavelengths, a filter portion that separates the light emitted from the multi-wavelength light source according to wavelength, and a condensing lens that focuses a plurality of light separated by the filter portion on the same point for multi-wavelength recording.

Furthermore, a recording medium according to the present invention records information using light, wherein the recording medium is substantially transparent with respect to two lights of different wavelengths, information is recorded by a change of an optical characteristic only when the two lights are focused on the same point, and a wavelength of one light of the two lights is ½ a wavelength of the other light.

Furthermore, another recording medium according to the present invention records information using light, wherein another recording medium is substantially transparent with respect to two lights of different wavelengths, information is recorded by a change of an optical characteristic only when the two lights are focused on the same point, the recording medium having a characteristic of being absorptive with respect to a sum frequency of the two lights, and a wavelength of the sum frequency being given by $\lambda1 \times \lambda2/(\lambda1+\lambda2)$, where the wavelength of one of the lights is given as $\lambda1$ and the wavelength of the other light is given as $\lambda2$.

BEST MODE FOR CARRYING OUT THE INVENTION

With an optical information processing device according to the present embodiment, complicated controls or the like are not necessary, since multi-wavelength recording is carried out using a plurality of lights emitted from the same light source and the plurality of lights can be focused easily on the same point. With this, recording can be carried out with recording interference when recording on a multilayer recording medium or recording on a recording medium in a volumetric direction.

Furthermore, it is preferable that the condensing lens focuses the plurality of lights separated by the filter portion on the same point via respectively different optical paths. With this, recording can be carried out with recording interference when recording on a multilayer recording medium or recording on a recording medium in a volumetric direction.

Furthermore, it is preferable that a polarizing filter for controlling the light of different wavelengths into light of respectively different polarizations further is provided. With this, recording can be carried out in the recording medium on which recording is to be practiced based on a polarized light direction of the light used.

Furthermore, it is preferable that the multi-wavelength light source is provided with a coherent light source that emits a fundamental wave and an optical wavelength conversion element for converting a portion of the fundamental wave emitted from the coherent light source into a higher harmonic wave, and emits light of two different wavelengths of the fundamental wave and the higher harmonic wave. With this, recording can be carried out using the fundamental wave and the higher harmonic wave with multi-wavelength recording and the fundamental wave and the higher harmonic wave can be emitted from the same point.

Furthermore, the multi-wavelength light source may be constituted by a semiconductor laser.

Furthermore, it is preferable that the coherent light source is provided with a function of varying a wavelength of the emitted fundamental wave, a conversion efficiency of the higher harmonic wave of the optical wavelength conversion element is changed by changing the wavelength of the fundamental wave emitted from the coherent light source, and an output ratio of the fundamental wave and the higher harmonic wave emitted from the multi-wavelength light source is controlled. With this, the output ratio of the fundamental wave and the higher harmonic wave can be controlled easily.

Furthermore, it is preferable that the filter portion is an optical filter having a transmission characteristic that is dependent on a wavelength of a light for at least one of transmittance, diffraction efficiency, and polarization, wherein the characteristic is not uniform within a surface of the optical filter. With this, the plurality of lights emitted from the multi-wavelength light source can be focused on the same point such that their optical paths do not overlap.

Furthermore, it is preferable that the filter portion is a ring-shaped band aperture filter, and a transmission characteristic of a light is different in a ring-shaped band aperture portion of the ring-shaped band aperture filter and a portion other than the ring-shaped band aperture portion. With this, the spot diameter of light that penetrates the ring-shaped band aperture portion can be reduced further with super resolution. For this reason, when the spot diameters of the lights are different, it is possible to unite these spot diameters.

Furthermore, it is preferable that the filter portion is a ring-shaped band aperture filter, and only the fundamental wave penetrates the ring-shaped band aperture portion of the ring-shaped band aperture filter, and only the higher harmonic wave penetrates the portion other than the ring-shaped band aperture portion of the filter. With this, the focused spot of the fundamental wave, which is larger compared with the higher harmonic wave, can be reduced to make it easier to unite the focused spot size of the higher harmonic wave and the fundamental wave.

Furthermore, it is preferable that the plurality of lights separated by the filter portion is focused on the same point in the recording medium, the recording medium comprises a material wherein at least one of refractive index, absorption coefficient, and fluorescence characteristic changes by focusing the plurality of lights separated by the filter portion, and information is recorded by focusing on the same point in the recording medium. With this, information can be recorded in the recording medium.

Furthermore, it is preferable that the recording medium is made from a plurality of recording layers.

Furthermore, it is preferable that the recording medium is made of a single layer and locations in which the information is recorded are distributed in a thickness direction. With this, the recording medium can be manufactured at low cost.

Furthermore, it is preferable that the recording medium comprises a photochromic material.

Furthermore, it is preferable that the fundamental wave and the higher harmonic wave are focused on the same point in a recording medium, the recording medium is substantially transparent to the fundamental wave and the higher harmonic wave, and has a characteristic of being absorptive with respect to a sum frequency of the fundamental wave and the higher harmonic wave, a wavelength of the sum frequency is given by $\lambda1 \times \lambda2/(\lambda1+\lambda2)$, where the wavelength of one of the lights is $\lambda1$ and the wavelength of the other light is $\lambda2$, and information is recorded by focusing on the same point in the recording medium. With this, information can be recorded in a recording medium based on two-photon absorption using the fundamental wave and the higher harmonic wave thereof.

Furthermore, it is preferable that the recording medium is made from a plurality of recording layers.

Furthermore, it is preferable that the recording medium is made of a single layer and locations in which the information is to be recorded are distributed in the thickness direction. With this, the recording medium can be manufactured at low cost.

Furthermore, it is preferable that the recording medium comprises a photochromic material.

Furthermore, with a recording medium of the present embodiment, recording can be carried out using absorption of two wavelengths. Furthermore, with a recording medium of another embodiment, recording can be carried out using two-photon absorption.

Furthermore, it is preferable that the recording medium comprises a photochromic material.

Furthermore, it is preferable that the recording medium has a multilayer structure.

The following are descriptions of specific embodiments of the present invention.

An optical information processing device of the present embodiment emits a fundamental wave and a higher harmonic wave from the same point of emission using an optical wavelength conversion element, making it easy to focus these on the same point with a condensing lens as a focusing optical system. It further is characterized in that the fundamental wave and the higher harmonic wave are controlled individually using an optical filter having transmission characteristics that are different with respect to the fundamental wave and the higher harmonic wave, and high functionality is achieved in two-wavelength recording using the fundamental wave and the higher harmonic wave.

As for the optical recording method, an optical recording method using two different wavelengths is suitable, such as optical recording based on two-photon absorption using a non-linear optical effect, optical recording based on a reaction with two wavelengths using a photochromic effect, multilayer recording such as volumetric holograms and volumetric recording.

EMBODIMENT 1

The following is a description of an optical information processing device according to an Embodiment 1 of the present invention with reference to the accompanying drawings. With an optical information processing device according to Embodiment 1, optical recording with two wavelengths in which there is no recording interference between recording layers is possible in the recording of information to a recording medium that has multilayer recording layers.

There are several ways of recording on a recording medium capable of recording information by irradiating two wavelengths onto the recording medium. For example, there is a method in which the molecular structure of the recording medium is changed by irradiating a light of one wavelength and then information is recorded in this state by irradiating light of a different wavelength. Furthermore, there is a method in which recording and fixing are carried out with light of two wavelengths. Furthermore, there is a method in which information is recorded by using the two-photon absorption of two wavelengths and levels excited by two wavelengths. In the case of such two-wavelength recording, multilayer recording is difficult when the two lights travel on the same optical path. When light of two wavelengths passes along the same optical path in the case of recording to a recording medium of a multilayer structure, the light of the two wavelengths is irradiated onto recording layers other than the layer on which recording is being attempted. For this reason, exposure occurs on layers other than the layer on which recording is being attempted and interlayer recording interference occurs. Hereupon, description will be given concerning an optical information processing device that, by using a light source and a wavelength conversion element, is capable of emitting light of two wavelengths (a higher harmonic wave and a fundamental wave) from the same point of emission and focusing the light on layers to which recording is being attempted, with the higher harmonic wave and the fundamental wave traveling on different optical paths.

Figure 1:
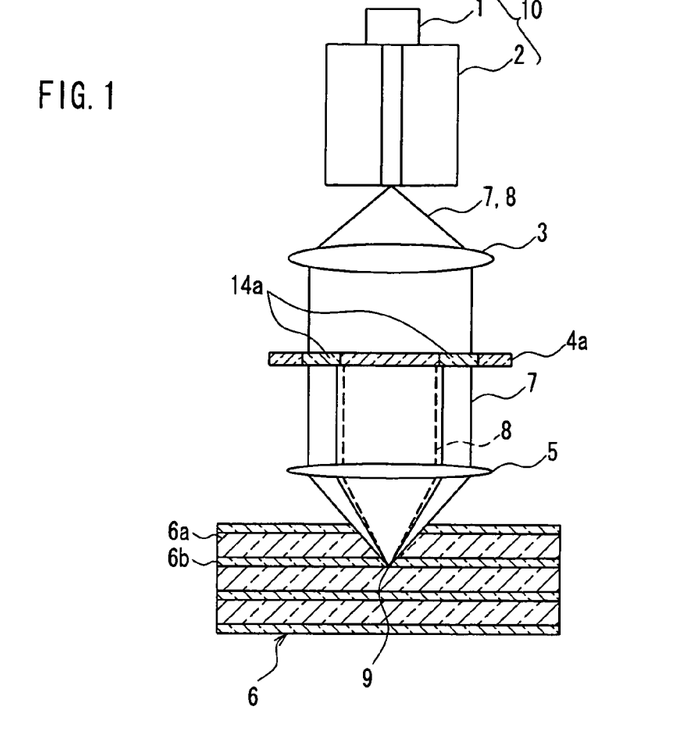
FIG. 1 is a side view showing a structure of an optical information processing device according to Embodiment 1.

FIG. 1 is a side view showing a structure of an optical information processing device according to Embodiment 1. The optical information processing device of Embodiment 1 is provided with a multi-wavelength light source 10, a collimator lens 3 that collimates light emitted from the multi-wavelength light source, a ring-shaped band aperture filter 4a, which is a filter that separates the light emitted from the multi-wavelength light source 10 into light of different wavelengths according to wavelength, and a condensing lens 5 that condenses the plurality of lights separated by the ring-shaped band aperture filter 4a to the same single point within the recording medium in order to carry out multi-wavelength recording.

The multi-wavelength light source 10 is provided with, for example, a DBR semiconductor laser 1, which is a coherent light source, and an optical wavelength conversion element 2 for converting the wavelength of light emitted from the DBR semiconductor laser 1. For example, a fundamental wave of an 820 nm wavelength emitted from the DBR semiconductor laser 1 is wavelength-converted to, for example, a higher harmonic wave of a 410 nm wavelength by the waveguide-type optical wavelength conversion element 2.

It should be noted that the waveguide-type optical wavelength conversion element 2 is constituted by, for example, an optical waveguide and a periodic-shaped polarization reversal structure formed within the optical waveguide. Light transmitted by the optical waveguide is wavelength-converted by a non-linear grating constituted by the periodic-shaped polarization reversal structure to generate a higher harmonic wave. The generated higher harmonic wave has a wavelength of ½ or ⅓ the wavelength of the incident light (fundamental wave). A structure in which Mg-doped lithium niobate is used is a typical example of the waveguide-type optical wavelength conversion element 2. The periodic-shaped polarization reversal structure is formed as a single crystal of Mg-doped lithium niobate. In this case, when there is a cycle of approximately 2.8 μm, the fundamental wave of a 820 nm wavelength can be converted into a higher harmonic wave of a 410 nm wavelength.

Furthermore, the conversion efficiency of the optical wavelength conversion element 2 is, for example, approximately 50%. That is, approximately half of the fundamental wave emitted from the DBR semiconductor laser 1 is converted into a higher harmonic wave 8 and is emitted at the same time as a fundamental wave 7 from the optical wavelength conversion element 2. The guided wave modes of the emitted fundamental wave 7 and the higher harmonic wave 8 are both fundamental modes of TE00.

Figure 2A:
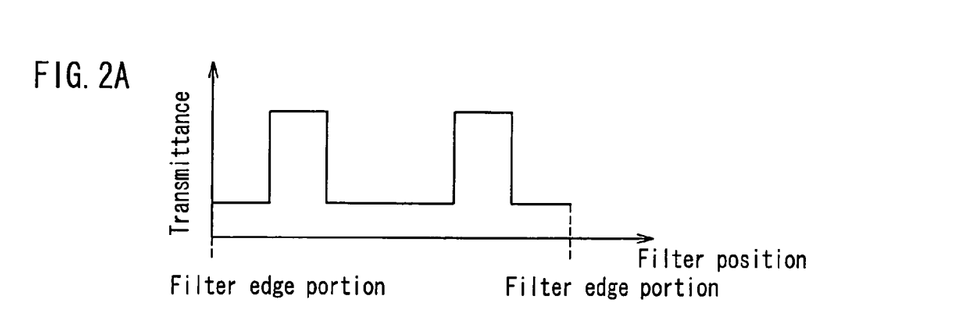
FIG. 2A is a graph showing the transmission characteristics of a fundamental wave in a filter portion of the optical information processing device according to Embodiment 1.
Figure 2B:
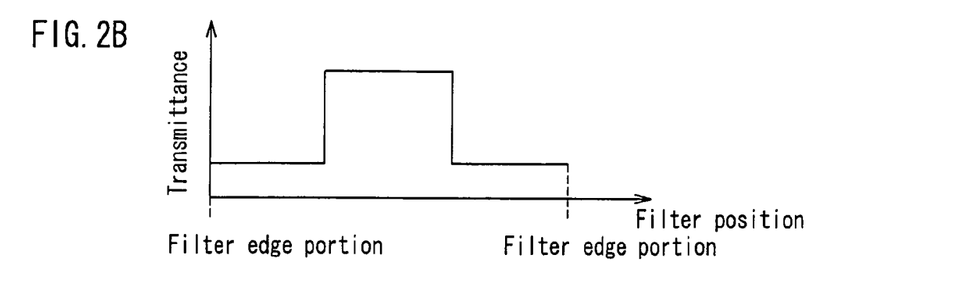
FIG. 2B is a graph showing the transmission characteristics of a higher harmonic wave in the filter portion of the optical information processing device according to Embodiment 1.

The ring-shaped band aperture filter 4a, which is a filter portion, is a filter that has different transmission characteristics in the surface therein. Specifically, there are different transmission characteristics at a ring-shaped band aperture portion 14a and the inner circle therein. FIGS. 2A and 2B use the horizontal axis to indicate positioning along the surface direction of the ring-shaped band aperture filter 4a and show the transmittance thereof on the vertical axis. FIG. 2A is a graph showing the transmission characteristics of a fundamental wave 7 (light of an 820 nm wavelength) with regard to the ring-shaped band aperture filter 4a, and FIG. 2B is a graph showing the transmission characteristics of a higher harmonic wave 8 (light of a 410 nm wavelength) with regard to the ring-shaped band aperture filter 4a.

As is evident from FIGS. 2A and 2B, the fundamental wave 7 penetrates the ring-shaped band aperture portion 14a, but the higher harmonic wave 8 does not penetrate. Furthermore, contrary to this, the higher harmonic wave 8 penetrates the area inside the ring-shaped band aperture portion 14a, but the fundamental wave 7 does not penetrate. For this reason, as shown in FIG. 1, the fundamental wave 7 and the higher harmonic wave 8 emitted from the multi-wavelength light source 10 are incident on the ring-shaped band aperture filter 4a via the collimator lens 3, and are separated and emitted such that they respectively take different optical paths. The fundamental wave 7 and the higher harmonic wave 8 emitted from the ring-shaped band aperture filter 4a take different optical paths and are incident on the condensing lens 5 without overlapping. Since it passes through the ring-shaped band aperture portion 14a, the fundamental wave 7 causes a super resolution phenomenon and is focusable on a spot smaller than the diffraction limit. For this reason, it is possible to reduce the diameter of the focused spot and carry out extremely high-density recording.

The condensing lens 5 is provided with color correction functionality for correcting differences in the wavelengths of the fundamental wave 7 and the higher harmonic wave 8. Further still, by passing through the condensing lens 5, the fundamental wave 7 and the higher harmonic wave 8 are focused on the same focal point 9 in a recording medium 6. At this time, the fundamental wave 7 and the higher harmonic wave 8 travel on different optical paths until the focal point 9 in the recording medium 6, and therefore they are both focused and coincide on the focal point 9 without overlapping. Thus, two-wavelength recording is carried out at the focal point 9. It should be noted that the recording medium 6 is a structure in which a recording layer 6a and an intermediate layer 6b are alternately layered.

Such a structure is effective as an optical system in which to carry out recording and reproduction for a multilayer recording medium using light of two wavelengths and enables optical information processing device such as this to be achieved. With the optical information processing device of Embodiment 1, light having the different wavelengths of the fundamental wave 7 and the higher harmonic wave 8 travels until the focal point 9 on different optical paths, and therefore it is possible to prevent interlayer recording interference in the recording medium 6. The number of layers of the recording medium can be increased such that high-density recording is achieved. Furthermore, since the fundamental wave 7 and the higher harmonic wave 8 are separated from a single light and emitted from the same multi-wavelength light source 10, the fundamental wave 7 and the higher harmonic wave 8 can be controlled easily.

Using the optical information processing device of Embodiment 1, writing (recording) of information was carried out for a recording medium constructed of an azobenzene polymer. A certain type of azobenzene polymer is a material with which recording can be carried out using two wavelengths.

The multi-wavelength light source 10 emits light of an 820 nm wavelength as the fundamental wave 7 and emits light of a 410 nm wavelength as the higher harmonic wave 8, which is wavelength-converted. The azobenzene polymer of which the recording medium 6 is constructed is absorptive with respect to light of a wavelength in the vicinity of 440 nm. When a blue region light (in the vicinity of 440 nm wavelength) is irradiated, azobenzene polymer changes repetitively to a cis-trans-cis derivative. By irradiating a fundamental wave having polarized light orthogonal to polarized blue region light to the azobenzene polymer that repetitively changes, the trans is fixed and the molecular direction is aligned in one direction. At this time, the refractive index of the recording medium 6 changes, thus making recording possible.

For this reason, in addition to the ring-shaped band aperture filter 4a, it is preferable to arrange an optical filter (polarizing filter) making the polarizing light direction of the fundamental wave 7 and the higher harmonic wave 8 orthogonal. The optical filter (polarizing filter) may be inserted between the ring-shaped band aperture filter 4a and the condensing lens 5. It should be noted that it is preferable to add an optical filter (polarizing filter) or the like making the polarizing light direction of the fundamental wave and the higher harmonic wave orthogonal, according to the recording characteristics of the recording medium.

In this way, it is possible to carry out recording by focusing the fundamental wave 7 and the higher harmonic wave 8 on the focal point 9 in the recording medium 6. Furthermore, the recording density can be improved by making the recording medium 6 a multilayer structure and it is possible to record information on 20 or more recording layers 6a without causing recording interference between the layers of the recording medium 6. Furthermore, by using the optical information processing device of Embodiment 1, it becomes possible to record to a recording medium having a multilayer structure comprising a photochromic material. The reason for this is explained below.

The recording interference that occurs between layers formed in the recording medium 6 is particularly remarkable in the case of photochromic materials in which recording is carried out using a photochemical reaction. In the case of thermal recording, since recording does not occur without a temperature above a fixed temperature, recording does not occur even when a low power light is repetitively irradiated. However, in the case in which a photochemical reaction is produced such as in a photochromic material, the irradiation of light in the photochromic material accumulates. For this reason, the integral value of the amount of irradiation increases due to repetitive irradiation even for a low power light, resulting in the recording medium 6 being exposed. Accordingly, the optical information processing device of Embodiment 1 is particularly effective when using the recording medium 6 having a multilayer structure comprising a photochromic material.

The optical information processing device of Embodiment 1 demonstrates the following effects.

The optical information processing device of Embodiment 1 is structured such that light of two wavelengths is emitted from the same point. Conventionally, light of two wavelengths with different points of emission are separated by the ring-shaped band aperture filter and these lights are focused onto the same point. However, the designing of the optical system this involves is considerably difficult and lacks stability. Further still, fine adjustments for the focus and tracking optical systems become complicated.

In contrast to this, with the optical information processing device of Embodiment 1 shown in FIG. 1, it is possible to emit the fundamental wave 7 and the higher harmonic wave 8 of different wavelengths from the same point of emission by providing the wave-guiding optical wavelength conversion element 2. Accordingly, this should be configured such that light of two different wavelengths emitted from the same point of light source is focused on the same point. Furthermore, the condensing lens 5 easily can focus the different wavelengths of the fundamental wave 7 and the higher harmonic wave 8 on the same point by carrying out color correction. Furthermore, being configured as a confocal optical system, an effect is demonstrated in which a stable optical system can be easily configured even with regard to disturbances such as wavelength fluctuation of the optical system and point of emission positioning displacement.

The optical information processing device of Embodiment 1 shown in FIG. 1 is provided with the ring-shaped band aperture filter 4a. Of the light emitted from the multi-wavelength light source 10, the light that penetrates the ring-shaped band aperture portion 14a is that of the fundamental wave 7, and therefore focusing based on super-resolution of the fundamental wave 7 is possible. When the fundamental wave 7 and the higher harmonic wave 8 are focused on the same point, the focused spot of the fundamental wave 7 becomes larger since the wavelength of the fundamental wave 7 is longer than the wavelength of the higher harmonic wave 8. Optical recording is carried out when the focused spots of the fundamental wave 7 and the higher harmonic wave 8 are at a coincidence point. For this reason, portions of the focused spot of the fundamental wave 7 that extend outward from the focused spot of the higher harmonic wave 8 and do not overlap the focused spot of the higher harmonic wave 8 do not play a part in optical recording and therefore these portions of the fundamental wave 7 are to no purpose.

In the optical information processing device of Embodiment 1, the fundamental wave 7 passes through the ring-shaped band aperture portion 14a, and therefore is focused with super-resolution. For this reason, compared with an ordinary focused spot diameter, it is focusable to a focused spot diameter of 1/1.2. In this way, the focused spot diameter of the fundamental wave 7 becomes smaller and becomes substantially the same size as the focused spot diameter of the higher harmonic wave 8. Because of this, there is the advantage that the higher harmonic wave 8 overlaps portions in which the fundamental wave 7 is focused and optical recording can be carried out without wasting the power of the fundamental wave 7.

Furthermore, the areas of the recording medium 6 that undergo recording are the areas in which the two wavelengths overlap and where the two wavelengths are focused. A factor of the focusing characteristics that is particularly necessary is that the higher harmonic wave 8 has a short wavelength. For this reason, it is preferable as a transmission characteristic of the ring-shaped band aperture filter 4a that the transmission area of the fundamental wave 7 is set to an area displaced from the central vicinity of the ring-shaped band aperture filter 4a and that the transmission area of the higher harmonic wave 8 is set to the central vicinity.

It should be noted that, in Embodiment 1, a ring-shaped band aperture filter 4a is used whose transmission characteristics have a distribution based on the shape of the ring-shaped band aperture, but the same effect is also achievable by providing the ring-shaped band aperture portion of the filter with a different diffraction efficiency.

It also should be noted that the multi-wavelength light source 10 was provided with the coherent light source 1 and the optical wavelength conversion element 2 and emitted the fundamental wave 7 and the higher harmonic wave 8, but instead of this, it is also possible to use a semiconductor laser that produces light of different wavelengths. A two-wavelength or three-wavelength laser that produces light of different wavelengths is achievable with a semiconductor laser formed by developing different laser mediums on the same substrate. The positions of the active layers of a semiconductor laser that produces light of different wavelengths is close to 10 μm or less. Furthermore, as in the case of the multi-wavelength light source 10 provided with the coherent light source 1 and the optical wavelength conversion element 2, it is also possible to focus light onto the same focal point 9 using an optical system (condensing lens 5) that uses chromatic aberration. In particular, light source miniaturization can be achieved and is beneficial when a two-wavelength laser is used as the multi-wavelength light source.

The ring-shaped band aperture filter 4a is used in the optical information processing device shown in FIG. 1, but there is no limitation to this in the present invention. Any optical filter is sufficient as long as it can achieve separation for the fundamental wave 7 and the higher harmonic wave 8. In this way it is possible to prevent interlayer recording interference in the recording medium and it is easy to record to a multilayer-structured recording medium. Furthermore, multi-layer configurations are achievable based on photon mode recording.

Figure 3:
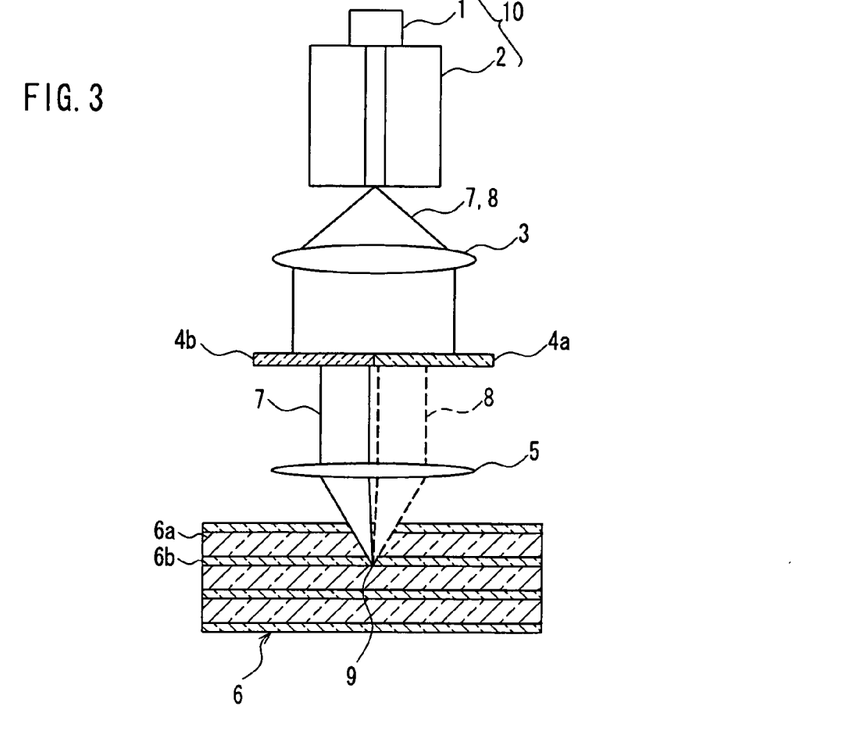
FIG. 3 is a side view showing a structure of another optical information processing device according to Embodiment 1.

FIG. 3 is a side view showing a structure of another optical information processing device according to the Embodiment 1. An optical filter 4b is arranged instead of the ring-shaped band aperture filter 4a in the information processing device of FIG. 3, but other than that it has the same structure as the optical information processing device shown in FIG. 1.

Figure 4A:
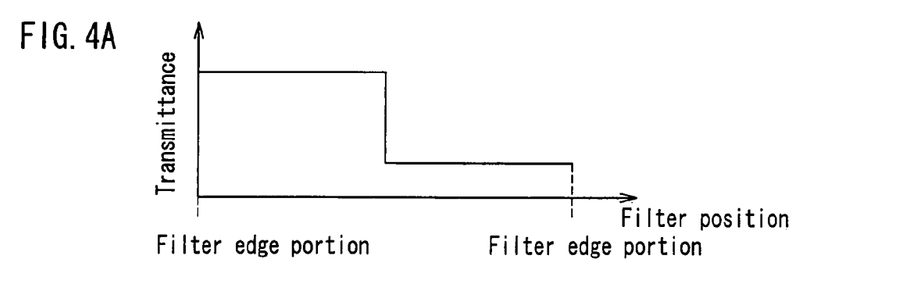
FIG. 4A is a graph showing the transmission characteristics of a fundamental wave in a filter portion of another optical information processing device according to Embodiment 1.
Figure 4B:
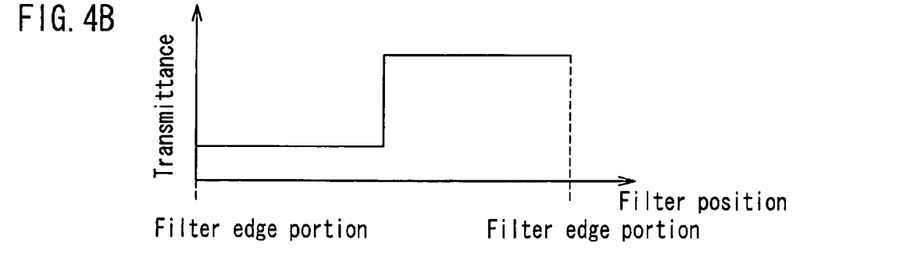
FIG. 4B is a graph showing the transmission characteristics of a higher harmonic wave in a filter portion of another optical information processing device according to Embodiment 1.

The transmission characteristics of the optical filter 4b in FIG. 3 are shown in FIGS. 4A and 4B. FIGS. 4A and 4B use the horizontal axis to indicate positioning along the surface direction of the optical filter 4b and show the transmittance thereof on the vertical axis. FIG. 4A is a graph showing the transmission characteristics of a fundamental wave (light of an 820 nm wavelength) with regard to the optical filter 4b, and FIG. 4B is a graph showing the transmission characteristics of a higher harmonic wave (light of a 410 nm wavelength) with regard to the optical filter 4b. As evident from FIGS. 4A and 4B, the fundamental wave 7 penetrates a left-side half portion of the optical filter 4b, but the higher harmonic wave does not penetrate. Furthermore, the higher harmonic wave penetrates a right-side half portion of the optical filter 4b, but the fundamental wave 7 does not penetrate.

For this reason, as shown in FIG. 3, the fundamental wave 7 and the higher harmonic wave 8 emitted from the multi-wavelength light source 10 are incident on the optical filter 4b via the collimator lens 3, and are separated and emitted such that they respectively take different optical paths on the left and right. The fundamental wave 7 and the higher harmonic wave 8 separated by the optical filter 4b are incident on the condensing lens 5 and travel on different optical paths to be focused on the same focal point 9, which is a recording location in the recording medium 6.

Furthermore, in order to separate the fundamental wave and the higher harmonic wave, it is also possible to separate by bringing about a grating effect using a filter that separates cyclically. Furthermore, it is also possible to use such filters as a filter that separates two-dimensionally into random areas, and a filter that separates into several areas.

Figure 5:
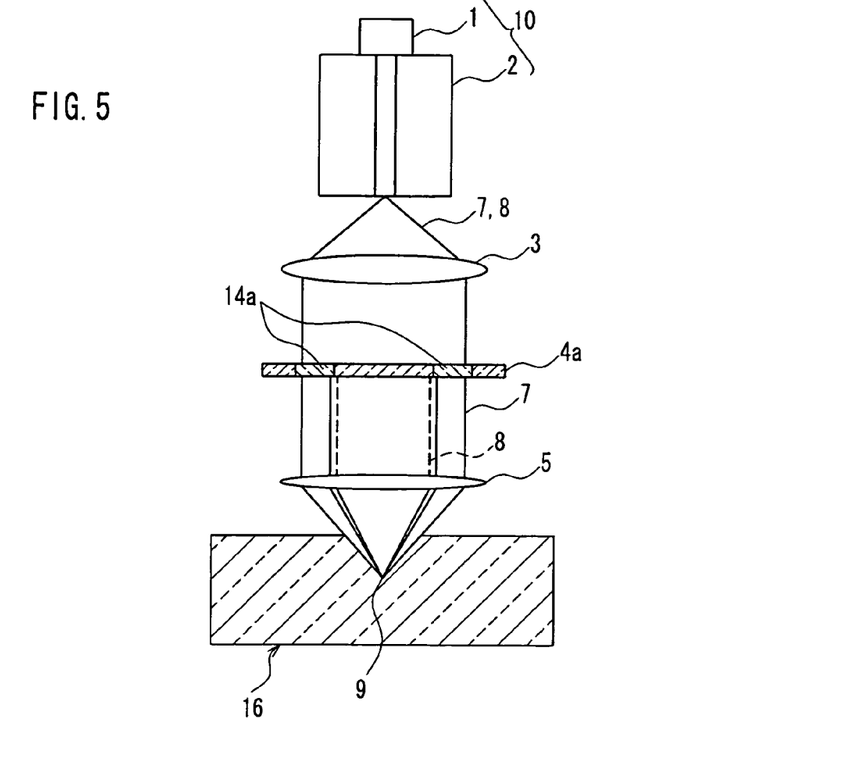
FIG. 5 is a side view showing a structure of yet another optical information processing device according to Embodiment 1.
Figure 6A:
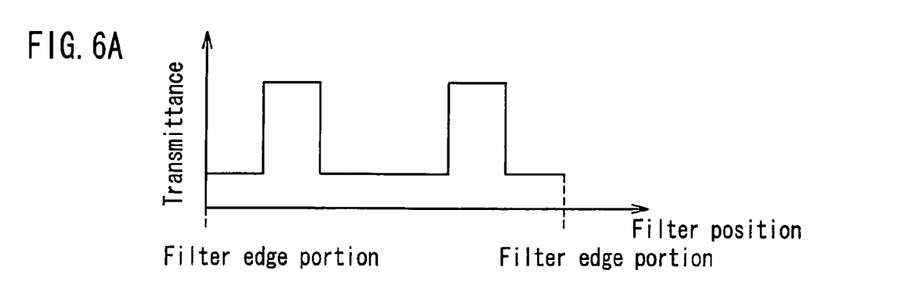
FIG. 6A is a graph showing the transmission characteristics of a fundamental wave in a filter portion of yet another optical information processing device according to Embodiment 1.
Figure 6B:
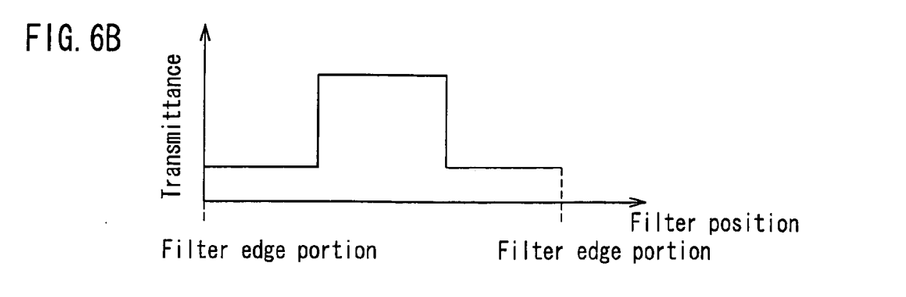
FIG. 6B is a graph showing the transmission characteristics of a higher harmonic wave in a filter portion of yet another optical information processing device according to Embodiment 1.

Furthermore, as shown in FIG. 5, instead of a multilayer structured recording medium, it is also possible to use a single-layer structured recording medium in which recording is carried out in the directions of the surface and the depth (thickness) of the recording medium by way of volumetric recording. FIG. 5 is a side view showing a structure of yet another optical information processing device according to Embodiment 1. A point of difference between the optical information processing device shown in FIG. 5 and the optical information processing device shown in FIG. 1 is that instead of the multilayer structured recording medium 6 (FIG. 1), a single-layer structured recording medium 16 (FIG. 5) is used. Other than that, the structures of FIG. 1 and FIG. 5 are the same. FIGS. 6A and 6B use the horizontal axis to indicate positioning within the surface of the ring-shaped band aperture filter 4a and show the transmittance of the penetrating light on the vertical axis. FIG. 6A is equivalent to FIG. 2A, and FIG. 6B is equivalent to FIG. 2B.

Even with a single-layer structured recording medium 16, if the fundamental wave 7 and the higher harmonic wave 8 are controlled so as to focus on the focal point 9 desired for recording, it is possible to record information at the focal point 9 the same as with a multilayer structured recording medium. The single-layer structured recording medium 16 has the effect of having low manufacturing costs.

It should be noted that the multi-wavelength light source 10 was described as emitting light of two different wavelengths, but it is also possible that it emits light of three or more different wavelengths. Furthermore, the filter portion that separates the plurality of lights emitted from the multi-wavelength light source 10 should be an optical portion having transmission characteristics that are wavelength-dependent for at least one of transmittance, diffraction efficiency, and polarization and that has transmission characteristics that are not uniform within the surface of the optical filter.

Furthermore, the recording medium 6 should comprise a material that changes with respect to at least one of refractive index, absorption coefficient, and fluorescence characteristics by being focused on by the plurality of lights separated by the filter portion.

EMBODIMENT 2

The following is a description of an optical information processing device according to Embodiment 2 of the present invention with reference to the accompanying drawings.

An object of the optical information processing device according to Embodiment 2 is to achieve optical recording with two-photon absorption using a non-linear optical effect based on light of two different wavelengths. Description will be given concerning the optical information processing device according to Embodiment 2 using FIG. 7.

Figure 7:
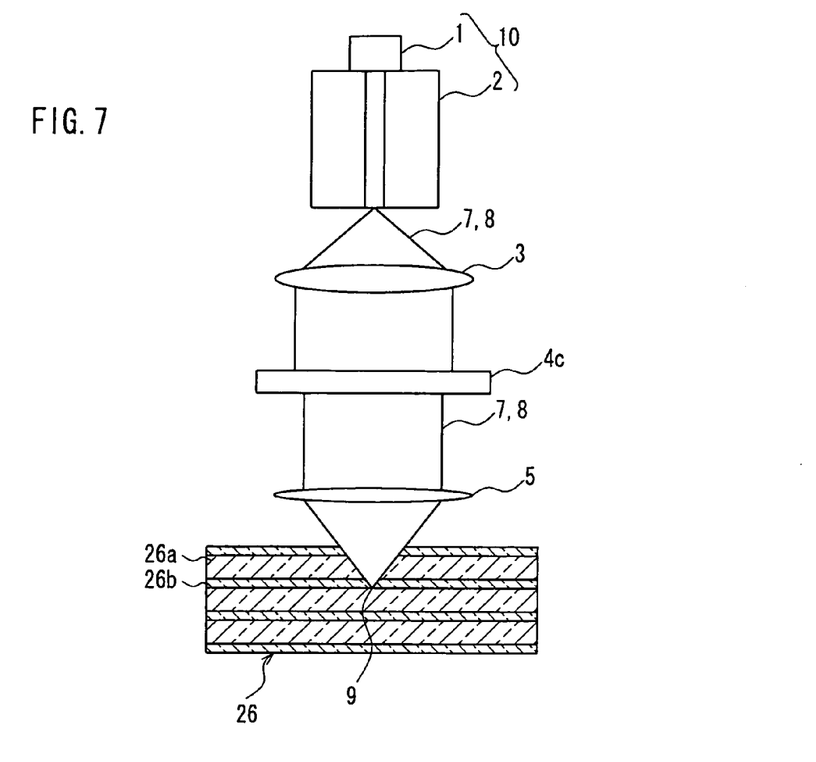
FIG. 7 is a side view showing a structure of an optical information processing device according to Embodiment 2.

The optical information processing device shown in FIG. 7 is a configuration arranged with an optical filter 4c instead of the ring-shaped band aperture filter 4a of the optical information processing device shown in FIG. 1. Furthermore, unlike the recording medium 6 shown in FIG. 1, a recording medium 26 shown in FIG. 7 is structured using a material that is recordable by two-photon absorption and is structured with alternate layers of a recording layer 26a and an intermediate layer 26b. Other than that, the structure is the same as that of the optical information processing device of FIG. 1.

Figure 8A:
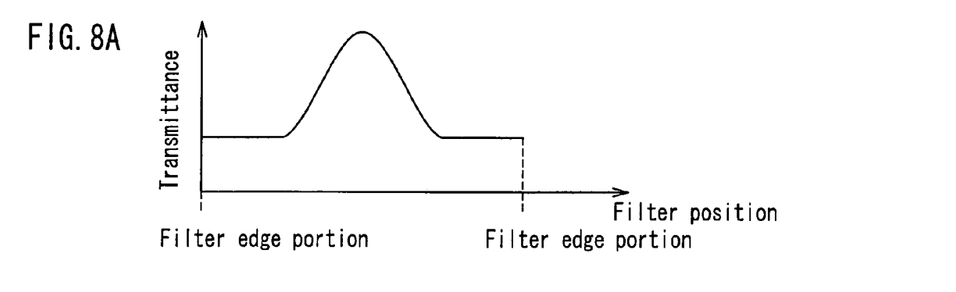
FIG. 8A is a graph showing the transmission characteristics of a fundamental wave in the filter portion of the optical information processing device according to Embodiment 2.
Figure 8B:
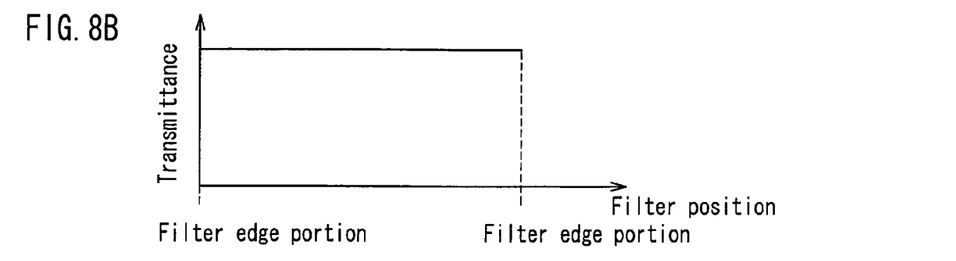
FIG. 8B is a graph showing the transmission characteristics of a higher harmonic wave in the filter portion of the optical information processing device according to Embodiment 2.

The transmission characteristics of the optical filter 4c in FIG. 7 are shown in FIGS. 8A and 8B. FIGS. 8A and 8B use the horizontal axis to indicate positioning along the surface direction of the optical filter 4c and show the transmittance thereof on the vertical axis. FIG. 8A is a graph showing the transmission characteristics of a fundamental wave 7 (light of an 820 nm wavelength) with regard to the optical filter 4c, and FIG. 8B is a graph showing the transmission characteristics of a higher harmonic wave 8 (light of a 410 nm wavelength) with regard to the optical filter 4c. As is evident from FIGS. 8A and 8B, the optical filter 4c has a gradient-type transmittance distribution with respect to the fundamental wave 7. Specifically, in the central portion of the optical filter 4c, the fundamental wave 7 has high transmittance, and the transmittance becomes progressively lower from the center outwards. Furthermore, the entire surface of the optical filter 4c is transparent to the higher harmonic wave 8.

The fundamental wave 7 and the higher harmonic wave 8 are emitted from the same wave-guiding optical wavelength conversion element 2, but since their wavelengths are greatly different, the confinement within their optical waveguides are different. For this reason, the angles of divergence from the optical waveguides are greatly different, with the angle of divergence of the fundamental wave 7 being larger than the angle of divergence of the higher harmonic wave 8. Accordingly, when the emitted light from the optical wavelength conversion element 2 is collimated by the collimator lens 3, the surface area of the fundamental wave 7 is considerably larger than that of the higher harmonic wave 8, and the focusing characteristics of the fundamental wave 7 and the higher harmonic wave 8 are likely to be different.

There is a method of inserting an optical filter that blocks the peripheral portions of the fundamental wave 7 to make uniform the focusing characteristics of the fundamental wave 7 and the higher harmonic wave 8, and this can be carried out easily. Further still, in order to use the power of the fundamental wave 7 effectively, it is necessary to correct the cross section area of the beam of the fundamental wave 7, but it is preferable that the higher harmonic wave 8 is not subjected to any effect at this time. For this reason, it is preferable that an optical filter having different transmission characteristics for the fundamental wave 7 and the higher harmonic wave 8 within its surface is used as in the optical filter 4c shown in the transmittance distribution in the above-mentioned FIGS. 8A and 8B.

In FIG. 7, a portion of a fundamental wave of an 820 nm wavelength emitted from the DBR semiconductor laser 1 as a coherent light source is wavelength-converted to a higher harmonic wave of a 410 nm wavelength by the waveguide-type optical wavelength conversion element 2. In this way, the fundamental wave 7 and the higher harmonic wave 8 are emitted simultaneously from the waveguide arranged at the optical wavelength conversion element 2. The guided wave modes both are emitted at the fundamental mode of TE00.

The fundamental wave 7 and the higher harmonic wave 8 are incident on the optical filter 4c via the collimator lens 3. The fundamental wave 7 and the higher harmonic wave 8, whose angles of convergence are controlled by the optical filter 4c, are incident on the condensing lens 5. The condensing lens 5 is provided with color correction functionality for correcting differences in the wavelengths of the fundamental wave 7 and the higher harmonic wave 8, and the fundamental wave 7 and the higher harmonic wave 8 are focused on the same point in the recording medium 26. Since the focusing characteristics of the fundamental wave 7 and the higher harmonic wave 8 are made uniform by the optical filter 4c, these are focused on the same point in the recording medium 26.

A high-output pulse light can be obtained by pulse driving the DBR semiconductor laser 1 that outputs the fundamental wave. For example, a pulse width less than 20 to 30 picoseconds can be produced by using a semiconductor laser that has a supersaturated absorber. The pulse width can be reduced further by wavelength-converting this using a non-linear optical effect. Furthermore, high-output laser output with a lead value of several 100 mW is possible by pulse-driving the DBR semiconductor laser 1, and high-efficiency SHG (second harmonic generation) output can be obtained by wavelength-converting this using the optical wavelength conversion element 2. In this way, the fundamental wave 7 and the higher harmonic wave 8 emitted from the optical wavelength conversion element 2 are focused on the focal point 9, which is the same point in recording medium 26, and the power density of the fundamental wave 7 and the higher harmonic wave 8 is increased at the focal point 9. From this, two-photon absorption is produced using a non-linear optical effect.

If the wavelength of the fundamental wave 7 is given as $\lambda 1$ and the wavelength of the higher harmonic wave 8 as $\lambda 2$, then two-photon absorption occurs at the sum frequency of fundamental wave 7 and the higher harmonic wave 8. The wavelength $\lambda 3$ of the sum frequency becomes: $\lambda 3 = \lambda 1 \times \lambda 2 / (\lambda 1 + \lambda 2)$. When second harmonic generation is used for the higher harmonic wave 8, $\lambda 2 = \lambda 1 / 2$, and therefore $\lambda 3 = \lambda 1 / 3$. For example, two-photon absorption of a 273 nm wavelength is produced using two photons of the 820 nm wavelength fundamental wave 7 and the 410 nm wavelength higher harmonic wave 8. With two-photon absorption such as this, there is no need for the output of the multi-wavelength light source 10 to become excessively large.

Optical recording using light of a 273 nm wavelength based on two-photon absorption is carried out in the recording medium 26. A material used for the recording medium 26 should absorb almost no light with regard to 820 nm wavelength light (fundamental wave) and 410 nm wavelength light (higher harmonic wave), but absorb light of a 273 nm wavelength and should be a material whose refractive index or absorption coefficient changes. From this, it is possible for the fundamental wave 7 and the higher harmonic wave 8 to reach the recording layer 26a in which the focal point 9 exists, without being absorbed in areas other than the focal point 9 of the recording medium 26.

It should be noted that even when the two wavelengths are not related by being in a fundamental wave and its harmonic wave relationship, two-photon absorption occurs at a wavelength $\lambda 6 = \lambda 4 \times \lambda 5 / (\lambda 4 + \lambda 5)$, which is the sum frequency of these two lights, where the two wavelengths are respectively $\lambda 4$ and $\lambda 5$.

Two-photon absorption is produced at the focal point 9 in order to increase the power density. However, the transmission characteristics of the fundamental wave 7 and the higher harmonic wave 8 (recording light) are maintained at any recording layer 26a other than the focal point 9, and therefore there is no recording interference. That is, optical recording can be carried out by increasing the power density of the fundamental wave 7 and the higher harmonic wave 8 (recording light), even at a recording layer 26a distantly positioned from the surface of the recording medium 26 in the thickness direction. High transmission characteristics are maintained as they are in the recording layer 26a in which optical recording is not carried out. From this, optical recording can be carried out in the recording medium 26 even when the number of layers of the recording layer 26a is increased.

In the optical information processing device of Embodiment 2, the fundamental wave 7 and the higher harmonic wave 8 are fundamental modes emitted from the same multi-wavelength light source 10, and therefore are emitted from the same point of emission. For this reason, the condensing lens 5 is able to focus easily the fundamental wave 7 and the higher harmonic wave 8 on the same point by merely correcting chromatic aberration.

Furthermore, the fundamental wave 7 and the higher harmonic wave 8 always maintain a $\lambda 2 = \lambda 1 / 2$ relationship. This relationship is always maintained even when there are fluctuations in the environmental temperature or wavelength fluctuation of the light source, and therefore designing for correction of chromatic aberration is easy, thus having the effect that two wavelengths can be focused stably on the same point. Furthermore, since there is a high degree of allowance in the manufacture and adjustment of the respective components, an effect is achieved in that production yields and assembly yields are high.

When reproducing the information recorded in the recording medium 26, a higher harmonic wave of a 410 nm wavelength for example should be used. Since recording can be carried out with a wavelength equivalent to 273 nm when recording using a non-linear optical effect, recording density can be increased. Furthermore, since reading is carried with a higher harmonic wave of 410 nm, a recording density equivalent to a wavelength of 410 nm is possible in consideration of crosstalk and the like. Recording of extremely high density can be carried out.

Furthermore, in carrying out overwrite recording, since recording and reproduction are repeated and recorded information is repetitively erased and recorded while being verified, it is essential that recording light and reproduction light can be focused on the same focal point 9 and that there can be rapid switching between recording and reproduction.

With the optical information processing device of Embodiment 2, the fundamental wave 7 and the higher harmonic wave 8 are emitted from the same point. Furthermore, the fundamental wave 7 and the higher harmonic wave 8 are used for the recording light and the higher harmonic wave 8 is used for the reproduction light. For this reason, switching between the recording light and the reproduction light can be performed easily. Thus, overwrite recording is possible. However, in optical systems in which different light sources are used and the recording light and the reproduction light are respectively focused on the same point as in conventional optical information processing devices, it is necessary to synchronize the respective light sources in rapid switchovers. Furthermore, complicated control and optical systems are necessary for correcting wavelength fluctuation and power fluctuation in the respective light sources and for correcting focus.

With an optical information processing device of Embodiment 2, the power and the ratio thereof of the fundamental wave 7 and the higher harmonic wave 8, which are required for recording and reproduction, can be controlled easily. The ratio of the fundamental wave 7 and the higher harmonic wave 8 supplied by the optical wavelength conversion element 2 depends on the conversion efficiency, and the conversion efficiency depends on the wavelength of the fundamental wave 7. For example, it is possible to control the output wavelength of the DBR semiconductor laser 1, which is a coherent light source, using an electrode arranged in the DBR portion. For this reason, by controlling the DBR wavelength of the DBR semiconductor laser 1, it is possible to control the efficiency of converting from the fundamental wave to the higher harmonic wave, that is, it is possible to control the output ratio of the fundamental wave and the higher harmonic wave. In recording using two-photon absorption, it is necessary to control the output of the two light waves accurately, and this can be achieved easily with an optical information processing device of Embodiment 2.

In order to make low-power recording possible with a recording medium using two-photon absorption, it is preferable to achieve two-photon absorption efficiency improvements by increasing the nonlinear optical constant. In order to do this in the recording medium 26 that is constituted by a multilayer structure of the recording layers 26a and the intermediate layers 26b, it is preferable to use a highly nonlinear material for the intermediate layers 26b. The thickness of the recording layers 26a is at or below the submicron level, and giving consideration to the beam waist of the recording light, it is possible to achieve higher efficiency by generating a higher harmonic wave based on a non-linear optical effect at the intermediate layers 26b, outside the recording layers 26a, and absorbing this at the recording layers 26a.

Furthermore, since the intermediate layers 26b and the recording layers 26a can be designed separately, it is possible to use a highly nonlinear material for the intermediate layers 26b and to use a material that has a high recording sensitivity to higher harmonic waves for the recording layers 26a. This makes possible low power recording. For example, low power recording is possible by increasing the sensitivity using a photochromic material for the intermediate layer 26b.

Furthermore, the intermediate layers 26b may have a multilayer film structure. To achieve wavelength conversion, a material of high nonlinearity is required in the vicinity (beam waist vicinity) of the surface side (light source side) of the recording layers 26a, but in areas other than this there is no particular requirement for nonlinearity. Accordingly, high speed recording becomes possible when the intermediate layers 26b have a multilayer structure and are formed such that there is a layer of high nonlinearity on the upper surface of the recording layers 26a and a layer of high thermal conductivity on the lower side of the recording layers 26a.

For an intermediate layer 26b with high nonlinearity, it is possible to use, for example, $LiNbO_3$ or $LiTaO_3$, or an inorganic nonlinear material such as KTP and $KNbO_3$, an amorphous layer of an organic nonlinear material, or microcrystal materials of these. Further still, it is also possible to use a glass material into which these nonlinear materials have been admixed, or a glass material into which a semiconductor highly nonlinear material has been doped, or the like. Low-power, multilayer recording becomes possible by using a transparent highly nonlinear material.

It should be noted that in the optical information processing device of Embodiment 2, second harmonic generation is used for the higher harmonic wave 8 produced by the optical wavelength conversion element 2, but it is also possible to use a light due to third harmonic generation, sum frequency, difference frequency, and parametric generation, for example.

It also should be noted that in the optical information processing device of Embodiment 2, the recording medium 26 was described as a recording medium 26 of a multilayer structure, but a recording medium based on volumetric recording can be similarly used. In the case of a recording medium based on volumetric recording, since film deposition processing to form a multilayer structure is not required, there is the benefit that the cost of the recording medium can be reduced. Furthermore, volumetric recording can be applied to recording such as volume hologram and bit-by-bit recording.

Furthermore, instead of the optical filter 4c, it is possible to use the ring-shaped band aperture filter 4a that is used in Embodiment 1. And it is also possible to use an optical filter having transmission characteristics other than that. For example, various kinds of optical systems can be used that are provided with optical characteristics such as polarization, transmittance, absorption, and diffraction, or surface distribution of these optical characteristics that are different for the fundamental wave 7 and the higher harmonic wave 8. For example, the present invention can be applied not only to optical recording, but also to retrieving signals when reading out or to focusing, tracking, and referencing or the like.

For example, in the case of an optical information processing device in which recording is carried out on a hologram recording material, an organic photosensitive material is used in the recording medium. Organic photosensitive materials are sensitive to short wavelengths and have a high exposure sensitivity. When the recording light is used in the position detection for adjusting the tracking or focus of the recording position, there is a problem in that recording cannot be carried out when exposure begins. For this reason, it is possible to solve such problems by using a structure in which position detection is achieved with a fundamental wave and recording is achieved with a higher harmonic wave. The fundamental wave and the higher harmonic wave are emitted from the same point, and therefore position detection can be achieved easily since it is easy to make the focal point consistent. To use the fundamental wave in position detection, the filter portion should use a diffraction grating that diffracts only the light of the fundamental wave for example.

As described above, by applying light from a light source that emits the fundamental wave 7 and the higher harmonic wave 8 from the same location to two-photon absorption, recording interference between layers of the recording layer 26a can be reduced, and it is possible to narrow the spacing between recording layers, thus achieving improvements in recording density. Furthermore, instead of a multilayer structure, it is also possible to make the recording medium a single layer structure.

In Embodiments 1 and 2, it is preferable that a material is used for the recording media 6 and 26 that is substantially transparent to the fundamental wave 7 and the higher harmonic wave 8, and whose optical characteristics change only when these two lights are focused on the same point. It should be noted that the wavelength of the higher harmonic wave 8 is two times the wavelength of the fundamental wave 7.

Furthermore, for the recording medium, it is preferable that a material is used that is substantially transparent to light of two different wavelengths, and whose optical characteristics change only when these two lights are focused on the same point. When the wavelength of these two lights are given as $\lambda 1$ and $\lambda 2$, the wavelength of the light having absorption characteristics can be expressed: $\lambda 1 \times \lambda 2/(\lambda 1+\lambda 2)$.

Furthermore, the recording medium may comprise a photochromic material and may have a multilayer structure.

INDUSTRIAL APPLICABILITY

The optical information processing device of the present invention offers easy control of multi-wavelength light and is useful as an optical recording device or the like.

Furthermore, the recording medium of the present invention is useful as a recording medium for optical recording.

The invention claimed is:

1. An optical information processing device comprising:
a multi-wavelength light source that emits light of two or more different wavelengths,
a filter portion that separates the light emitted from the multi-wavelength light source according to wavelength, and
a condensing lens that focuses a plurality of lights separated by the filter portion on the same point for multi-wavelength recording,
wherein the multi-wavelength light source comprises a coherent light source that emits a fundamental wave and an optical wavelength conversion element for converting a portion of the fundamental wave emitted from the coherent light source into a higher harmonic wave, and emits light of two different wavelengths, which are the fundamental wave and the higher harmonic wave, and
wherein the filter portion is a ring-shaped band aperture filter, and only the fundamental wave penetrates the ring-shaped band aperture portion of the ring-shaped band aperture filter, and the only the higher harmonic wave penetrates the portion other than the ring-shaped band aperture portion of the filter.

2. The optical information processing device according to claim 1, wherein the condensing lens focuses the plurality of lights separated by the filter portion on the same point via respectively different optical paths.

3. The optical information processing device according to claim 1, further comprising a polarizing filter for controlling the light of different wavelengths into light of respectively different polarizations.

4. The optical information processing device according to claim 1, wherein the multi-wavelength light source comprises a semiconductor laser.

5. The optical information processing device according to claim 1, wherein:
the coherent light source is provided with a function of varying a wavelength of the emitted fundamental wave,
a conversion efficiency of the higher harmonic wave of the optical wavelength conversion element is changed by changing the wavelength of the fundamental wave emitted from the coherent light source, and
an output ratio of the fundamental wave and the higher harmonic wave emitted from the multi-wavelength light source is controlled.

6. The optical information processing device according to claim 1, wherein the filter portion is an optical filter having a transmission characteristic that is dependent on a wavelength of light for at least one of transmittance, diffraction efficiency, and polarization, wherein the characteristic is not uniform within a surface of the optical filter.

7. The optical information processing device according to claim 1, wherein:
the filter portion is a ring-shaped band aperture filter, and
a transmission characteristic of a light is different in a ring-shaped band aperture portion of the ring-shaped band aperture filter and a portion other than the ring-shaped band aperture portion.

8. The optical information processing device according to claim 1, wherein:
a plurality of lights separated by the filter portion is focused on the same point in the recording medium,
the recording medium comprises a material wherein at least one of refractive index, absorption coefficient, and fluorescence characteristic changes by focusing the plurality of lights separated by the filter portion, and
information is recorded by focusing on the same point in the recording medium.

9. The optical information processing device according to claim 8, wherein the recording medium is made from a plurality of recording layers.

10. The optical information processing device according to claim 8, wherein the recording medium is made of a single layer and locations in which the information is recorded are distributed in a thickness direction.

11. The optical information processing device according to claim 8, wherein the recording medium comprises a photochromic material.

12. The optical information processing device according to claim 1, wherein:
the fundamental wave and the higher harmonic wave are focused on the same point in a recording medium,
the recording medium is substantially transparent to the fundamental wave and the higher harmonic wave, and has a characteristic of being absorptive with respect to a sum frequency of the fundamental wave and the higher harmonic wave, a wavelength of the sum frequency is given by $\lambda 1 \times \lambda 2/(\lambda 1+\lambda 2)$ when the wavelength of the fundamental wave is $\lambda 1$ and the wavelength of the higher harmonic wave is $\lambda 2$, and information is recorded by focusing on the same point in the recording medium.

13. The optical information processing device according to claim 12, wherein the recording medium is made from a plurality of recording layers.

14. The optical information processing device according to claim 12, wherein the recording medium is made of a single layer and locations in which the information is recorded are distributed in a thickness direction.

15. The optical information processing device according to claim 12, wherein the recording medium comprises a photochromic material.

* * * * *